United States Patent [19]

Bezard et al.

[11] 4,163,391
[45] Aug. 7, 1979

[54] DEVICE FOR CHECKING THE LEVEL OF A LIQUID IN A TANK

[75] Inventors: Jean-Jacques Bezard, La Garenne; Charles-Henri Jourdain, Colombes; Bruno Lalanne, Courbevoie, all of France

[73] Assignee: Jaeger, Levallois-Perret, France

[21] Appl. No.: 837,543

[22] Filed: Sep. 28, 1977

[30] Foreign Application Priority Data

Oct. 6, 1976 [FR] France ................................ 76 30120

[51] Int. Cl.² .............................................. G01F 23/10
[52] U.S. Cl. ..................................... 73/295; 73/304 R
[58] Field of Search ............... 73/295, 304 R, 362 AR

[56] References Cited

U.S. PATENT DOCUMENTS

| 1,942,241 | 1/1934 | Duhme | 73/295 |
| 2,894,390 | 7/1959 | Talbot | 73/295 |
| 2,924,234 | 2/1960 | Wilson | 73/295 |

Primary Examiner—Donald O. Woodiel
Attorney, Agent, or Firm—Donald D. Jeffery

[57] ABSTRACT

A device for checking the level of a liquid in a tank, for example a car fuel tank, has an electrical resistance probe partly immersed in the liquid and energized with a constant current. The voltage across the probe at switching on is stored and used as a reference for comparing with the increased voltage after the element has been heated to a value dependent on the length of resistor cooled by the liquid.

10 Claims, 8 Drawing Figures

DEVICE FOR CHECKING THE LEVEL OF A LIQUID IN A TANK

The invention relates to a device for checking the level of a liquid in a tank, for example a motor vehicle fuel tank.

As is known, the resistance of a metal element having a high temperature coefficient of resistance, increases in dependence on the current which travels through it and heats the element. It has already been proposed to use this property for determining the level of a liquid since, when there is a decrease in the level of the liquid in which the resistive element is immersed, the average temperature of the element increases since the part exposed to air is much less cooled than the part still immersed. Thus, the total resistance of the element is dependent on the level of the liquid. Attempts have been made inter-alia to apply this principle to the determination of the level of a liquid in a motor vehicle tank, but the prior art devices are very sensitive to variations in ambient temperature, which greatly reduces their accuracy particularly when they are used in motor vehicles, where the temperature variations can be very marked.

An object of the invention is to provide a detector of the aforementioned kind which is independent of ambient temperature. Another object is to provide a probe having a simple design requiring only one wire to connect it to the measuring and alarm circuit, without the resistance of the wire influencing the measurement.

To this end, the device according to the invention comprises a resistive wire having a high temperature co-efficient and immersed in the liquid the level of which is to be monitored, a means for conveying a constant current through the wire, a means for measuring the voltage at its terminals and a means for comparing the voltage $U_t$ measured at instant t with the initial value $U_o$ at the instant $t_o$ when the device is put into operation. Both the voltages $U_o$ and $U_t$, depend on the ambient temperature and the resistance of the connecting leads in the same way, and their effects cancel one another.

DESCRIPTION OF PREFERRED EMBODIMENTS

The invention may be carried into practice in various ways, and certain embodiments will be described by way of example with reference to the accompanying drawings; of which FIG. 1 is a graph of voltages against time for describing the theory of the invention;

Figure 1:
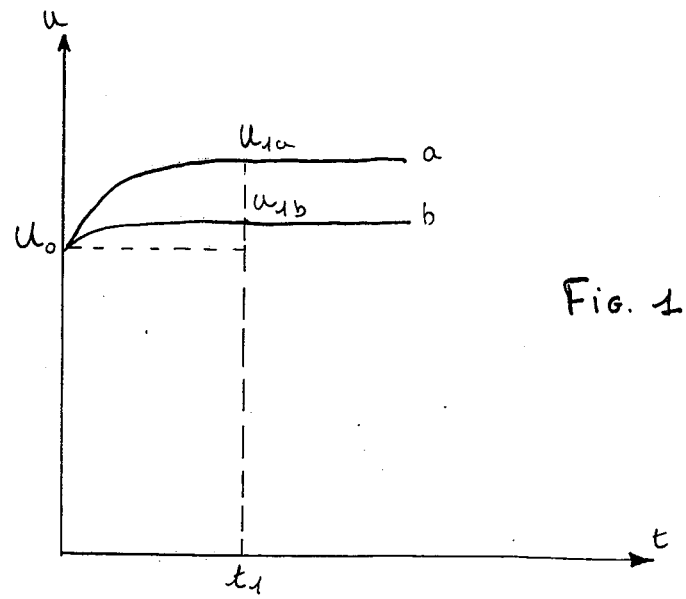
Figure 2:
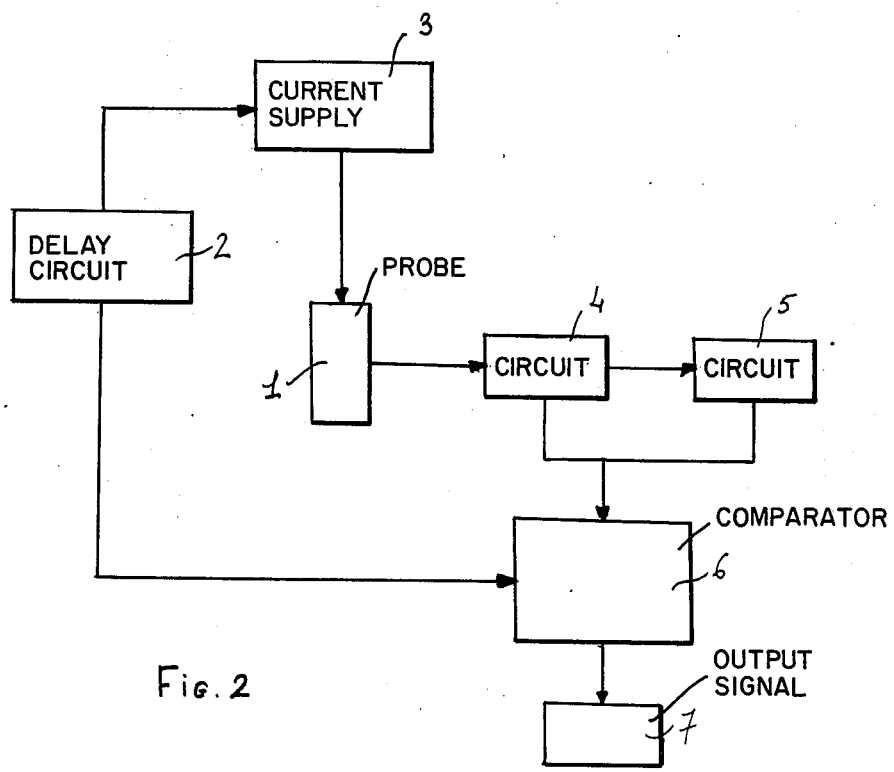
FIG. 2 is a block diagram of one embodiment of liquid level measuring device.

The probe 1 of FIG. 2 is a electrical resistance wire with a high temperature coefficient of resistance, and it is arranged to be energised with a constant current flowing through it. If the voltage across the probe at the time of switching on is $U_o$ as indicated in FIG. 1, the voltage across the wire will increase with time, as the wire is heated by the current, and its resistance increases, but the increase of resistance will depend upon the increase of temperature, and that in turn will depend upon the amount of the wire that is immersed in the liquid. Thus the curve a showing the voltage when the resistance probe is completely out of the liquid is above the curve b showing the voltage when the resistance is completely immersed in the liquid, and there will be curves at intermediate levels for intermediate levels of liquid.

It is not possible to get an accurate measurement of the resistance level in that way merely by determining the voltage $U_{1a}$ because for the same liquid level that voltage will vary, both with the ambient temperature and with the resistances in the electrical circuits associated with the probe.

In accordance with the invention, use is made not of the absolute voltage as measured across the probe, but the relationship of that voltage with the initial voltage across the probe at switching on before the probe resistance has heated up, because that initial voltage will depend in just the same way on those two factors.

Figure 3:
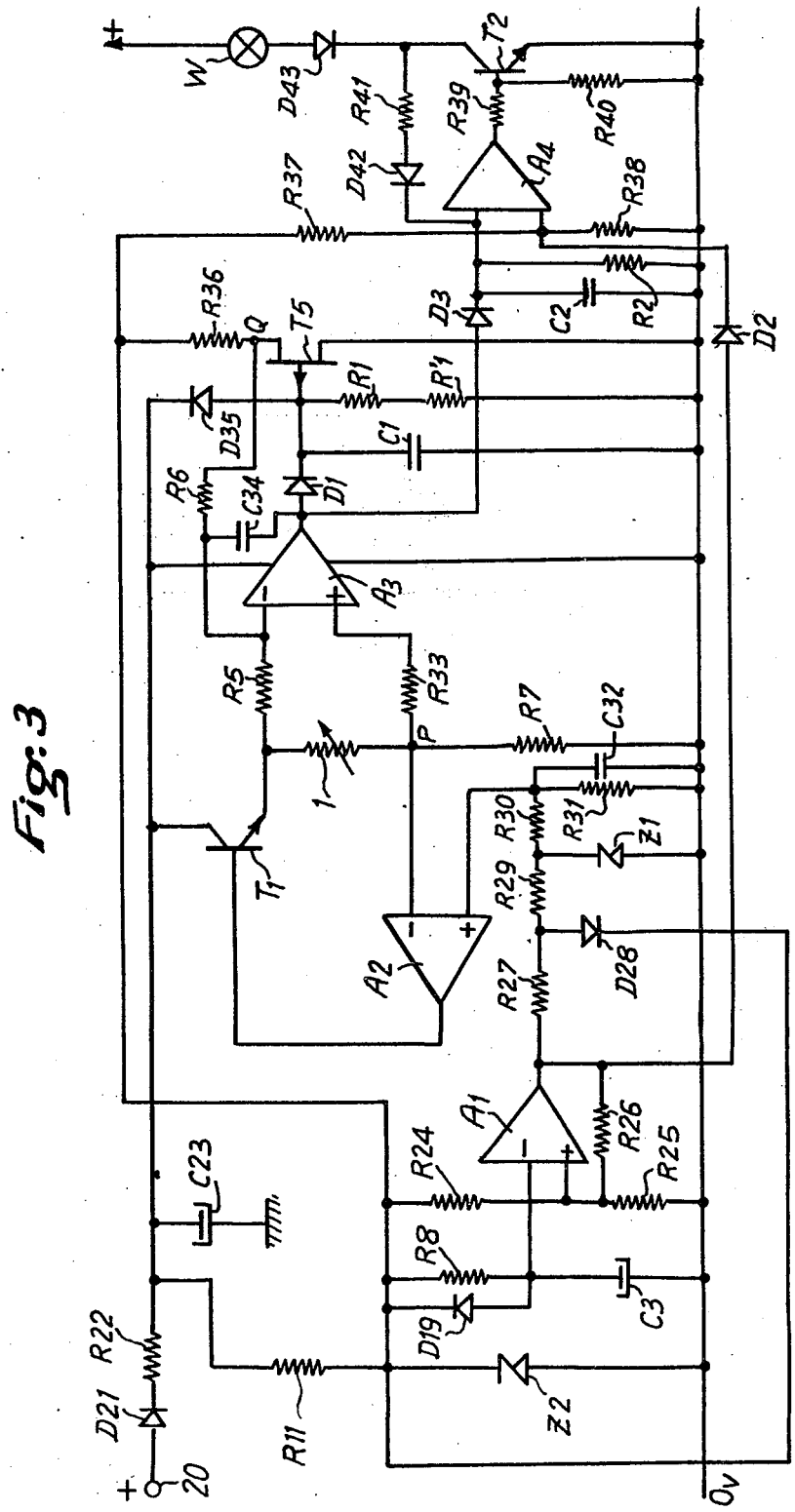
FIG. 3 is a circuit diagram of the arrangement of FIG. 2.

Thus in the embodiments shown in FIGS. 2 and 3, the probe 1 is energised from a constant current supply 3 at a first instant determined by a delay circuit 2, which has a built in delay t after which a comparator 6 is operated to compare two inputs. One of the inputs is derived from a circuit 4 which receives the voltage across the probe 1, and provides an output (V−U) where V is the voltage across the probe after sufficient time for the temperature to have stabilised and U is the initial voltage across the probe which will be $U_o$ as indicated in FIG. 1. At the instant of switching on, the circuit 4 also charges a capacitor in an RC delay circuit 5 with a voltage dependent upon the initial voltage $U_o$. The circuit 4 includes a reference supply and an inverter, so that the initial voltage to which the capacitance in the circuit 5 is charged is the highest voltage that will be encountered during a measurement, and that is shown at the Y axis in the top graph of FIG. 4. The voltage across the capacitor in the circuit 5 then decays linearly as indicated at δ shown in FIG. 4 and the decayed voltage from the capacitor 5 is one input to the comparator 6. The other input to the comparator 6 from the output of the circuit 4 will after the temperature of the probe has stabilised, be constant at a value α or λ or a value between those two depending on the level of liquid in which the probe is partly immersed.

Figure 4:
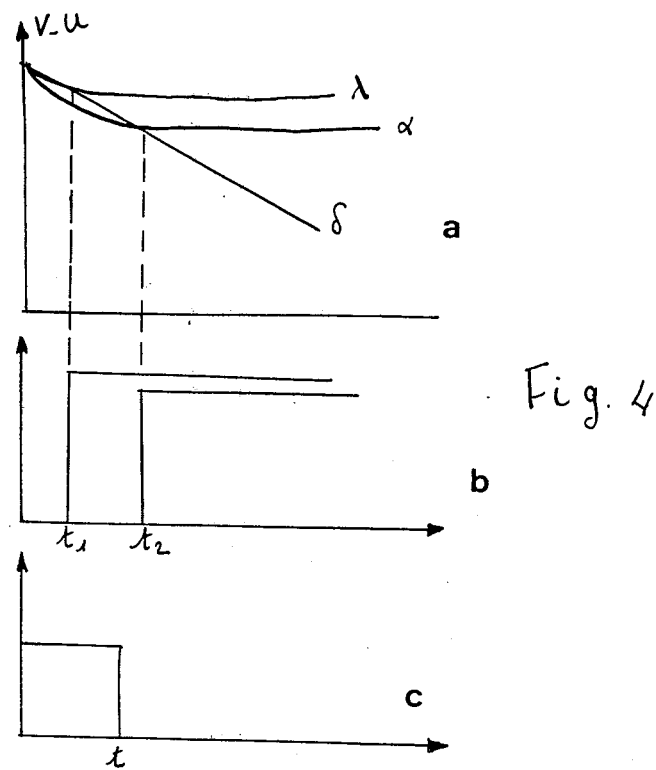
FIG. 4 is a set of graphs used in describing the operation of the device of FIGS. 2 and 3.

The time delay t is chosen as indicated in the lower two curves in FIG. 4 to be between the times $t_1$ and $t_2$ at which the capacitor voltage has decayed respectively to the values α and λ and that time t represents a certain liquid level in the tank. When it is rendered operative, by the delay circuit 2, the comparator then gives an indication whether the liquid level is above or below that predetermined level independence upon the relative magnitudes of the two inputs to the comparator. The comparator can be arranged to give an output signal at 7 merely indicating whether the level is above or below the set level, and if the level is below the set level, then an alarm could be arranged to be given.

The probe 1 is energised from a constant current source comprising an amplifier $A_2$ and a transistor $T_1$. The lower end of the probe 1 indicated at 'P' has its voltage held at a stabilised constant reference voltage 'V' constituting one input to an inverting differential amplifier $A_3$ whose output is initially $V-U_o$ but decreases after switching on as the voltage 'U' across the probe increases until the temperature of the probe becomes constant, and then the output of the amplifier $A_3$ is constant at V-U.

The initial output $V-U_o$ charges a capacitor $C_1$ constituting a component of the circuit 5 through a rectifier $D_1$. The capacitor $C_1$ is shunted by a resistor $R_1$ chosen so that the charge on $C_1$ decays more slowly than the output voltage of the amplifier $A_3$ drops with the heating of the probe 1.

Thus once the capacitor $C_1$ has received its initial charge $V-U_o$, the output of the amplifier $A_3$ will drop initially more quickly than the charge on the capacitor $C_1$ decays so that the rectifier $D_1$ will prevent any further charge being built up on the capacitor $C_1$.

The output from the amplifier $A_3$ is also supplied through a rectifier to one terminal of an amplifier $A_4$, and that output will be represented as logic '0' or logic '1' depending upon whether the rectifier $D_1$ is cut off, or is conducting, and so will depend on whether the voltage at the output of the amplifier $A_3$ is less than, or greater than the voltage across the capacitor $C_1$. At a point determined by the degree to which the probe is immersed in the liquid corresponding to the point in the first graph of FIG. 4 where the particular curve $\alpha$ or $\lambda$ or one between those two cuts the decay line $\delta$ the value changes from logic '0' to logic '1' and that is stored in a capacitor $C_2$.

The time delay circuit 2 includes an amplifier $A_1$ and after the preset time $t_1$, a trigger signal is provided to the other input of the amplifier which produces a '0' or '1' output dependent upon the '0' or '1' value stored on the capacitor $C_2$. A '0' value at that time interval indicates that the level of liquid in the tank is below the preset level and triggers a transistor $t_2$ so that a warning device W in the alarm circuit 7 is energised. The amplifier $A_4$ is latched on by a feed-back loop so that the warning continues to be given. Thus if the circuit energising the probe 1 is disconnected after the time delay $t_1$ in preparation for a further measurement, the result of the previous measurement is remembered by the amplifier $A_4$ and a warning will continue to be given during the next measurement.

The circuit of FIG. 3 will now be described in more detail.

The positive supply at 20 is through a diode $D_{21}$ giving protection against inverse voltages and a filter comprising a resistor $R_{22}$ and a capacitor $C_{23}$.

At switching on, capacitor $C_3$ is discharged. Zener diode $Z_2$ which is supplied via resistor $R_{11}$, is at a constant voltage. A fraction of that voltage is applied through a resistive voltage divider $R_{24}$ $R_{25}$ as a reference to the positive input of differential amplifier $A_1$, whose negative input receives the zero voltage which is then present at the terminals of capacitor $C_3$. Consequently amplifier $A_1$ has a positive output voltage for the period until the charge on capacitor $C_3$ through resistor $R_8$ on the negative input reaches the reference voltage defined by divider $R_{24}$ $R_{25}$.

Thereupon, the output of amplifier $A_1$ supplies Zener diode $Z_1$ via resistors $R_{27}$ and $R_{29}$. The circuit includes a diode $D_{28}$ which is connected back to the terminals of the other Zener diode $Z_2$, to ensure better stabilisation of the voltage at the terminals of Zener diode $Z_1$. A predetermined fraction of the stabilised voltage is applied by the resistive divider $R_{30}$ $R_{31}$ to a point 'L' connected to the positive input of differential amplifier $A_2$. Capacitor $C_{32}$ is used for eliminating interference at point 'L'.

Probe '1' is supplied with constant direct current by transistor $T_1$ so that the voltage at point 'P' is equal to the voltage at point 'L'. Since the same current travels through probe '1' and the fixed resistor $R_7$, the voltage at point 'P' is proportional to the current through the probe, which will therefore be constant.

In addition, the positive output of amplifier $A_1$ is connected to the positive input of amplifier $A_4$ via diode $D_2$. That positive voltage causes the output of amplifier $A_4$ to be positive, with the result that transistor $T_2$ is conductive and the alarm lamp 'W' is initially energised. (By means of diode 43, lamp 'W' can be subsequently used for purposes in addition to those according to the invention).

The negative input of differential amplifier $A_3$ receives the emitter voltage of transistor $T_1$ via resistor $R_5$. Its positive input is connected to point 'P' via a resistor $R_{33}$ to prevent voltage drift. Via a diode $D_1$, the output of amplifier $A_3$ biasses the grid of a field-effect transistor $T_5$ whose source 'Q' is connected to the negative input of amplifier $A_3$ via a resistor $R_6$ equal to $R_5$. (Capacitor $C_{34}$ is used for eliminating interference). The drain of transistor $T_5$ is earthed, whereas its source receives the stabilised voltage of Zener diode $Z_2$ via a resistor $R_{36}$.

Since $R_5=R_6$, point 'Q' is at the previously-mentioned voltage $V-U_o$, V being the voltage at point 'P' and $U_o$ being the voltage across the probe 1. Capacitor $C_1$ becomes charged at the aforementioned voltage (except for the grid-source potential difference of $T_5$), and the same voltage appears at the terminals of resistors $R_1$ and $R'_1$.

Thereupon, when the wire of probe 1 heats up, there is a proportional increase in the voltage 'U' and also in the voltage at the input of amplifier $A_3$. The output of $A_3$ decreases more quickly than capacitor $C_1$ discharges into resistors $R_1$ and $R'_1$, i.e. diode $D_1$ becomes non-conductive.

As a result, amplifier $A_3$ has no negative feedback and its output falls to zero.

After a time depending on the extent to which probe 1 is immersed in the liquid, the voltage at its terminals becomes stable whereas the voltage at the terminals of capacitor $C_1$ which continues to decrease (discharging into $R_1$ and $R'_1$) simultaneously reduces the voltage at point 'Q'. When the latter voltage becomes less than V-U, the negative feedback resumes and the output of amplifier $A_3$ increases (so that $D_1$ becomes conductive) up to the logic level '1' which is such that the voltage at 'Q' remains equal to V-U (which is now constant). This logic level is stored by capacitor $C_2$ via diode $D_3$.

In amplifier $A_1$, the values of resistor $R_8$ and capacitor $C_3$ are chosen so that the voltage at its negative input becomes equal to the voltage at its positive input after a time 'T' determined in the previously-described manner. At the instant 't' the output voltage of amplifier $A_1$ falls to zero, diode $Z_1$ is no longer energised, the voltage at point 'L' disappears, amplifier $A_2$ makes transistor $T_1$ non-conductive, and the voltage at 'P' disappears likewise. The voltage of $A_3$ falls to zero and remains there, since its positive input is zero whereas its negative input continues to be supplied by $R_6$ since the source voltage of transistor $T_5$ does not completely disappear, even when capacitor $C_1$ is discharged through resistor $R_1$.

The voltage at the terminals of capacitor $C_2$ remains for a short time, since diode $D_3$ is non-conductive.

Simultaneously, diode $D_2$ becomes non-conductive and the voltage at the positive input of $A_4$ becomes a fraction of the voltage of Zener diode $Z_2$, the fraction being defined by the resistive voltage divider $R_{37}$ $R_{38}$.

If the voltage at the terminals of capacitor $C_2$ is greater than the aforementioned value, indicating that the probe is suitably immersed, the output of amplifier $A_4$ becomes zero, transistor $T_2$ becomes non-conductive, and the alarm device 'W' is de-energised. If, on the contrary, the probe is not sufficiently immersed, the voltage at the terminals of capacitor $C_2$ is zero, the output of amplifier $A_4$ is positive, transistor $T_2$ is saturated and the alarm lamp 'W' remains energised.

A feedback circuit comprising resistor $R_{41}$ and diode $D_{42}$ and disposed between the collector of transistor $T_2$ and the negative input of amplifier $A_4$ maintains the last-mentioned state, even after the delay circut 2 has disconnected the measuring circuits.

Figure 5:
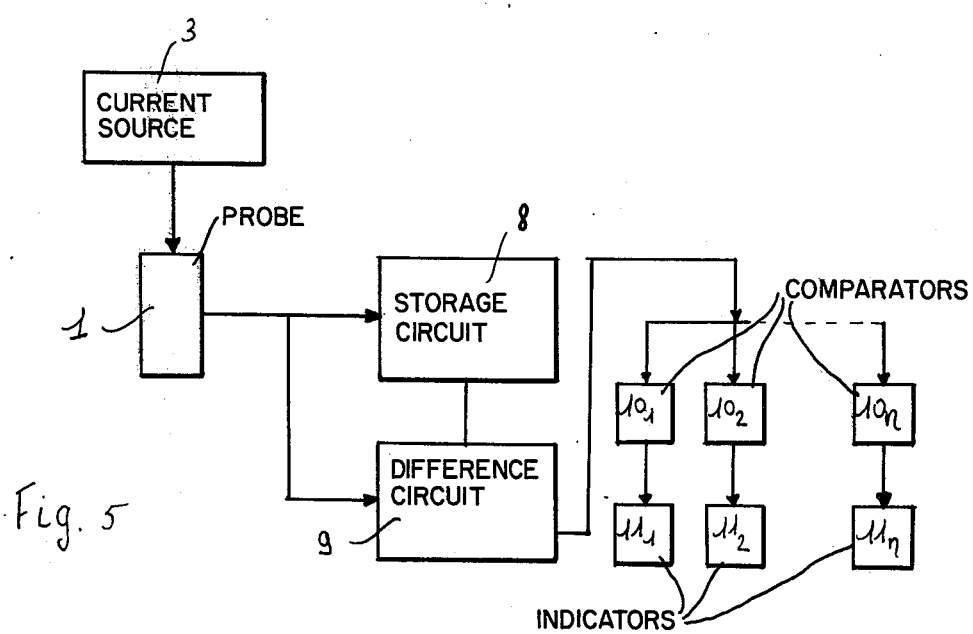
FIG. 5 is a block diagram of a second embodiment of liquid level measuring device.

The embodiment of FIG. 5 is for giving an indication whether any of a number of different liquid levels has been achieved in the tank. As before the probe '1' is energised from a constant current source 3, and the initial value $U_o$ at switching on, is stored in a storage circuit 8. The probe voltage is continually fed to a difference circuit 9 which provides an output dependent upon the difference between the stored value at 8, and the present value at 9 and delivers that as one input to a number of comparators $10_1 10_2 \ldots 10_n$ each having a source of a different reference voltage corresponding to a different liquid level. Each comparator drives its own indicator $11_1, 11_2 \ldots 11_n$ and an indication is given on any indicator when the difference signal is greater than the reference signal in the corresponding comparator.

Figure 6:
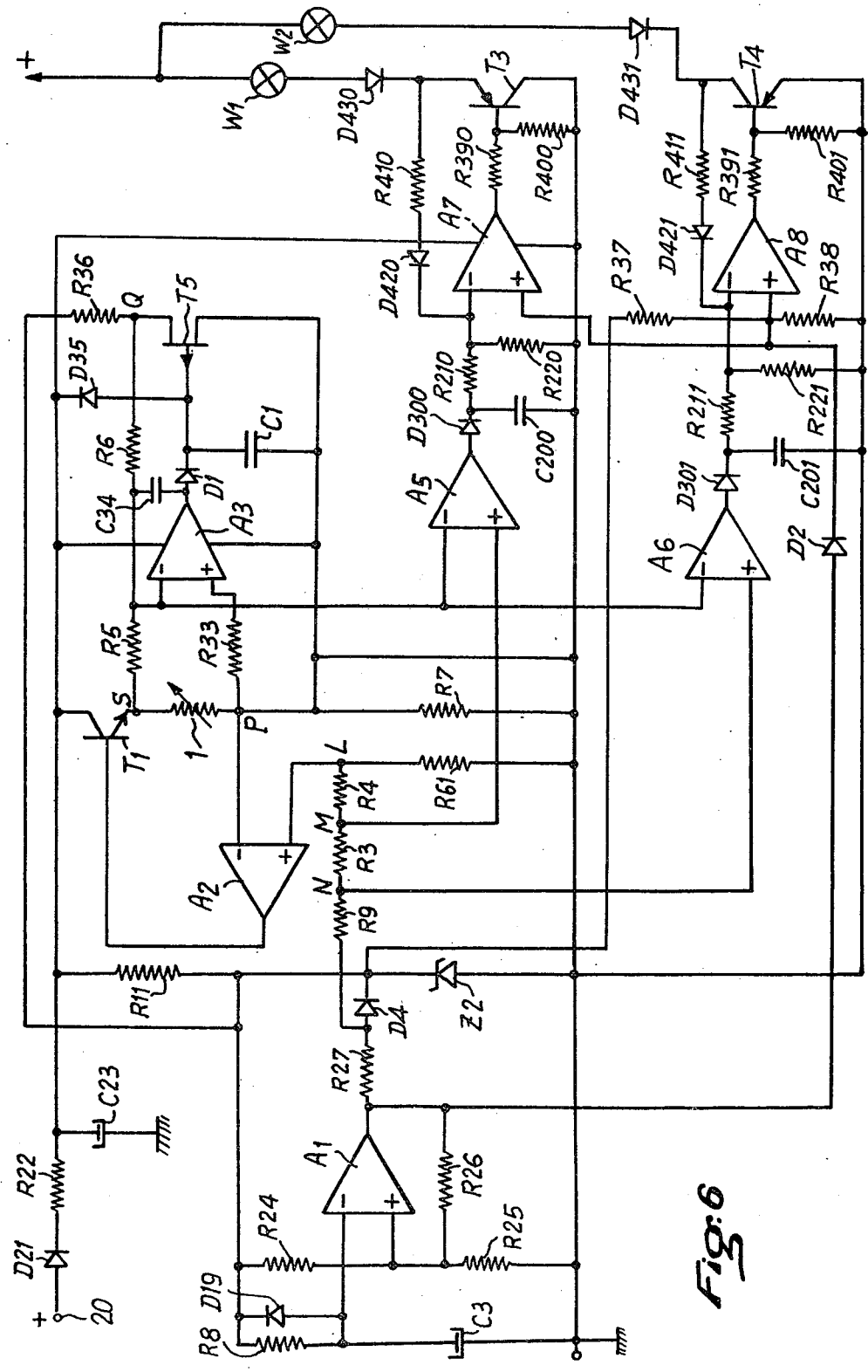
FIG. 6 is a circuit based on the device of FIG. 5.

The circuit of FIG. 6 is a modification of the circuit of FIG. 3, and similar components have the same reference numerals. In this case however, the arrangement is that an indication is given at $W_1$ or $W_2$ if the instantaneous voltage difference is at least equal to that of two difference reference voltages derived respectively at the resistors $R_3$ and $R_4$ and supplied to differential amplifiers $A_5$ and $A_6$.

FIG. 6 is largely similar to FIG. 3, and components fulfilling the same function will not be described again.

FIG. 6, however, does not include a Zener diode $Z_1$, and Zener diode $Z_2$ is now connected at the output of amplifier $A_1$. As before, the last-mentioned output is positive as long as the charge on capacitor $C_3$ remains below that fraction of the voltage of Zener diode $Z_2$ which is defined by resistors $R_{24}$ and $R_{25}$, in which case diode $D_4$ is conductive.

The anode voltage of diode $D_4$ is applied to a multiple resistive divider comprising resistors $R_9$, $R_3$, $R_4$ and $R_{61}$ defining points 'L' 'M' and 'N' (in the order of increasing voltage). The voltage at 'L' is 'V', the voltage and 'M' is $V+\Delta V1$ and the voltage at N, $V+\Delta V2$.

As in the preceding example, probe '1' is supplied with a constant current via amplifier $A_2$ and transistor $T_1$, since amplifier $A_2$ ensures that the voltages at 'L' and 'P' are equal and at the value 'V'. After the device has been energised, point 'Q' is brought to a potential having the form $(V-U_o)$, V being the stabilised voltage measured at point 'P'. After the wire of probe '1' heats up, the voltage available at point 'S' has the form $(V+U_o+\Delta U)$, $\Delta U$ representing the increase in the voltage at the terminals of probe '1'.

Resistors $R_5$ and $R_6$ form a bridge dividing by two, since $R_5=R_6$. Consequently the voltage applied to the inverting inputs of the amplifiers $A_3$, $A_5$ and $A_6$ is in the form $(V+(\Delta U/2)$. At each instant, this voltage is compared in $A_5$ and $A_6$ with the two reference voltages $V+\Delta V_1$ and $V+\Delta V_2$ supplied at the point 'M' and 'N' (corresponding to the two levels of the liquid which are to be monitored), the reference voltages being applied respectively to the non-inverting inputs of comparators $A_5$ and $A_6$. As soon as $\Delta U/2$ becomes equal to $\Delta V_1$ or $\Delta V_2$, the corresponding comparator changes logic level at its output so as to actuate the associated indicating and/or alarm means $W_1$ or $W_2$. Diode $D_{300}$, resistors $R_{210}$ and $R_{220}$ and capacitor $C_{200}$ disposed between amplifiers $A_5$ and $A_7$, and diode $D_{301}$, resistors $R_{211}$ and $R_{221}$ and capacitor $C_{201}$ disposed between amplifiers $A_6$ and $A_8$ correspond to diode $D_3$, the single resistor $R_2$ and capacitor $C_2$ between amplifiers $A_3$ and $A_4$ in FIG. 3.

At the end of the delay, the output of $A_1$ falls to zero. Diodes $D_4$ and $D_2$ becomes non-conductive; the voltages at points L,M,N, and P fall to zero but diode $Z_2$ is kept energised by resistor $R_{11}$ and maintains the signals on the positive inputs of $A_7$ and $A_8$, capacitor $C_3$ and point 'Q' (where the voltage, however, is lower).

It can be seen that in the present case, each alarm comprises an indicator $W_1$ or $W_2$ together with a store or memory circuit including amplifiers $A_7$ or $A_8$ and transistors $T_3$ or $T_4$ respectively. The passive components serve the same purpose as those in FIG. 3, and operation is identical with that of amplifier $A_4$ and transistor $T_2$ in FIG. 3. The circuits maintain an alarm, if any, after the measuring circuits have been cut off by the delay circuit 2.

Figure 7:
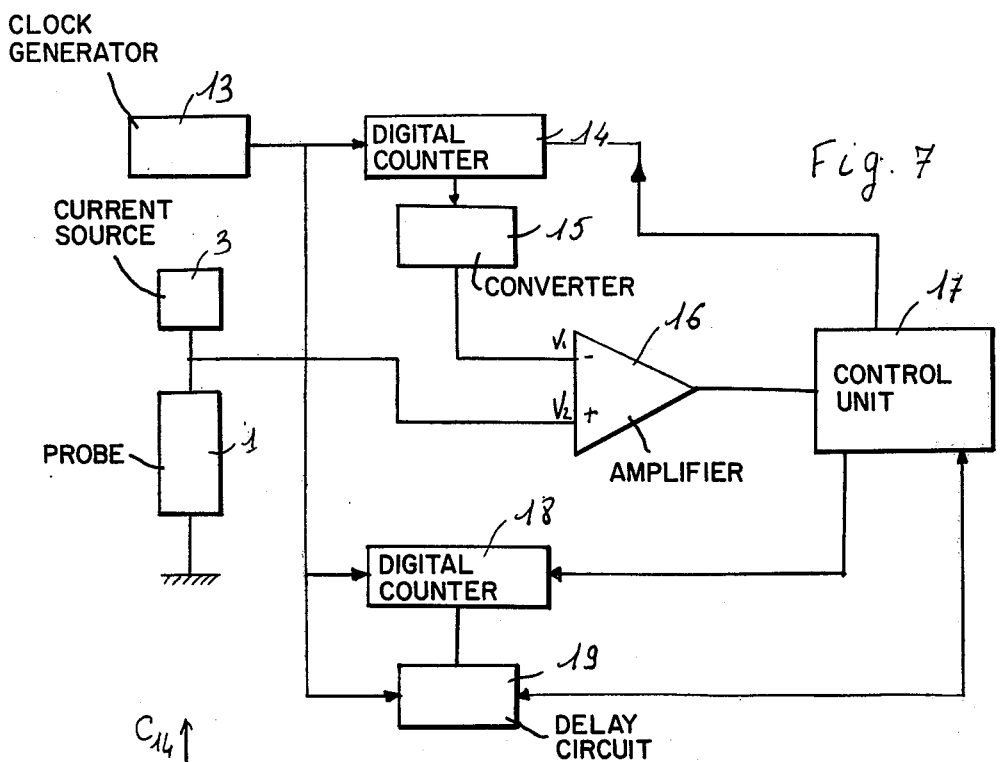
FIG. 7 is a block diagram of a third embodiment of the invention.
Figure 8:
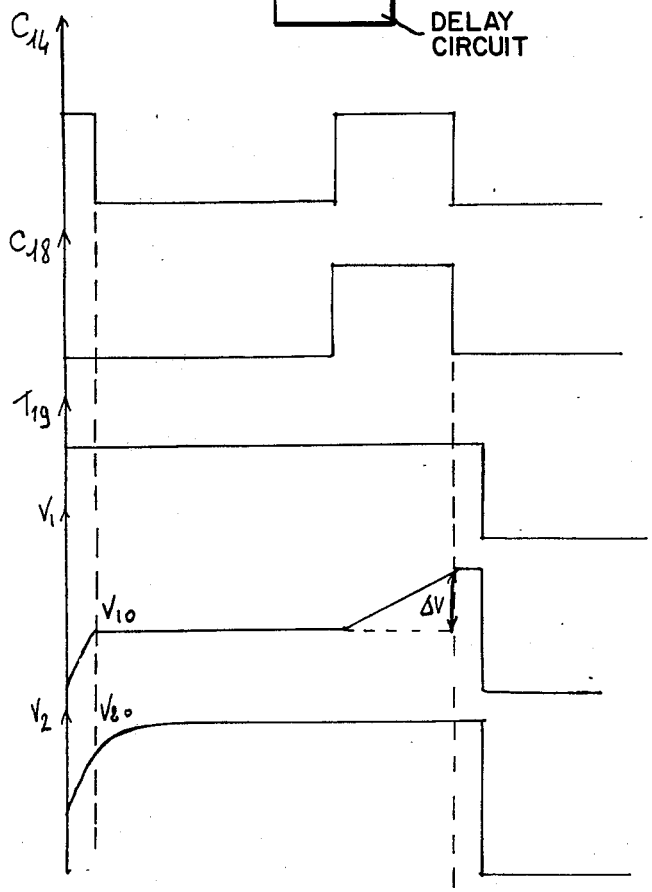
FIG. 8 is a set of time curves used in describing the operation of the device of FIG. 7.

In the embodiment of FIGS. 7 and 8 digital counters 14 and 18 of clock pulses from a clock generator 13 are used. At switching on the counter 14 counts clock pulses and feeds the count to a digital/analog converter 15 to provide an input $V_1$ to the negative input of a differential amplifier 16, which receives the voltage U across the probe 1 as its positive input $V_2$. At switching on, a control unit 17 enables counter 14 and disables counter 18. Counter 14 then counts until input $V_1$ reaches a value $V_{10}$ equal to value of input $V_2$, i.e. measured value $V_{20}$ corresponding to the initial value $U_o$ of the probe as discussed herein above. At that time, control unit 17 stops counter 14 in response to the output of differential amplifier 16, thereby storing in counter 14 a quantity corresponding to the initial value $U_o$. Then, the voltage $V_2$ across the probe continues to increase and the output of amplifier 16 changes again, with counter 14 remaining disabled and storing the value corresponding to $U_o$. A delay circuit 19 is also counting clock pulses until a present count is achieved. After the preset timing delay, a control unit 17 starts both counters 14 and 18, until the signal at $V_1$ again reaches the new signal at $V_2$. At that time, the control unit 17 responds to the output of amplifier 16 by switching off the counters 14 and 18 again. The counter 18 will retain the count necessary to achieve the new value $V_2$ consisting of the increasing voltage $\Delta V$ as shown in the fourth curve in FIG. 8. The count on the counter 18 is recorded and after a further time delay all the counters are reset ready for a new measurement. FIG. 8 shows from top to bottom the periods when the counter 14 is on; the period when the counter 18 is on; the delay $T_{19}$; the changing voltage $V_1$ at the negative input of the amplifier 16; and the positive voltage $V_2$ at the other input of the amplifier 16. It will be observed that since the voltages $V_1$ and $V_2$ from the converter 15 and the probe 1 are both proportional to the supply voltage, their ratio $V_1$ divided by $V_2$ is independent of variations in the supply voltage.

It will be seen that in all embodiments the voltage across the probe after it has stabilised at a certain temperature is compared with the voltage at switching on, so that errors due to variations in ambient temperature and resistance losses are compensated for. It will be clear that readings can be taken repeatedly provided the probe is given an opportunity to cool down after one reading has been taken, and before switching on for the next reading.

We claim:

1. Apparatus for monitoring the level of a liquid in a tank, comprising:
   an electrical resistance probe having a resistance value which increases with temperature, said probe arranged to be immersed to a level dependent upon the liquid level in said tank such that, when said probe is supplied with a constant current, the temperature and the resistance of said probe increase in dependence on the amount of said probe which is immersed;
   means energizable for supplying a constant current through said probe to produce a voltage across said probe dependent on the temperature of said probe; and
   means for comparing the initial voltage across said probe upon energization of said constant current supplying means with the voltage across said probe at a predetermined time after energization of said constant current supplying means, and for providing an indication dependent on said comparison, said indication being representative of the liquid level in said tank and being substantially independent of ambient temperature.

2. The apparatus of claim 1, wherein said comparing means comprises means for detecting and storing a representation of said initial voltage, and for detecting said voltage across said probe at said predetermined time; and a comparator for receiving and comparing said voltages and providing said indication.

3. The apparatus of claim 2, wherein said detecting and storing means provides an output voltage which decays in time from said initial voltage, and wherein said comparing means compares said voltage measured across said probe at said predetermined time with said output voltage which decays in time.

4. The apparatus of claim 3, wherein said detecting and storing means comprises a resistance-capacitance discharge circuit, said capacitance being charged to said initial voltage.

5. The apparatus of claim 2, wherein said detecting and storing means comprises an analog memory for storing said initial voltage value, and said comparator indication is continuously provided and comprises the difference between the instantaneous voltage across said probe and said stored representation of said initial voltage, said monitoring apparatus further comprising means for comparing said comparator indication with a predetermined number of reference voltages corresponding to respective different liquid levels.

6. The apparatus of claim 1, wherein said comparing means comprises:
   a source of clock pulses;
   first and second controllable means for counting said clock pulses;
   means for converting the digital output of said first counting means to an analog signal;
   a comparator having a first input coupled to receive the voltage across said probe, a second input coupled to receive the analog output of said converting means, and an output coupled to an input of a controlling means; and
   means responsive to the output of said comparator for selectively controlling said first and second counting means such that said controlling means initially enables said first counting means upon energization of said constant current supplying means until the output of said comparator indicates that the output of said converting means equals said initial voltage, and then disables said first counting means such that a count representative of said initial voltage is stored in said first counting means, and such that said controlling means, at said predetermined time after energization of said constant current supplying means, enables both said first and second counting means until the output of said comparator indicates that the output of said converting means equals the voltage across said probe at said predetermined time after energization of said constant current supplying means, whereby said second counting means provides a digital representation of the liquid level in said tank, substantially independent of ambient temperature.

7. The apparatus of claim 6, wherein said comparing means further comprises delay means coupled to said source of clock pulses and to said controlling means for defining the interval of said predetermined time.

8. The apparatus of claim 1, further comprising means for displaying the measured liquid level as provided by the indication from said comparing means.

9. The apparatus of claim 1, further comprising means for giving a warning if the measuring liquid level is below a predetermined level.

10. The apparatus of claim 8, further comprising means for holding the indication provided by said comparing means at the end of a measurement.

* * * * *